United States Patent [19]
Bennett et al.

[11] 3,985,535
[45] Oct. 12, 1976

[54] METHOD OF MAKING GLASS AMPUL FOR JET INJECTOR

[75] Inventors: Russell B. Bennett, Worthington; Clair E. Campbell; Howard B. Pritz, both of Columbus, all of Ohio

[73] Assignee: SmithKline Corporation, Philadelphia, Pa.

[22] Filed: June 19, 1975

[21] Appl. No.: 588,300

[52] U.S. Cl. .................................. 65/61; 65/30 E; 65/105; 65/108; 65/109; 428/410; 128/272
[51] Int. Cl.² ........................................ C03C 19/00
[58] Field of Search ............. 65/30 E, 61, 105, 104, 65/108, 109, 110; 128/272; 428/410

[56] References Cited
UNITED STATES PATENTS

| | | | |
|---|---|---|---|
| 1,888,635 | 11/1932 | Koenig | 65/105 |
| 2,090,861 | 8/1937 | Eisele | 65/61 |
| 2,151,840 | 3/1939 | Dichter | 65/109 X |
| 2,392,104 | 1/1946 | Smith | 65/109 X |
| 3,091,104 | 5/1963 | Morrill | 65/110 X |
| 3,445,316 | 5/1969 | Megles | 65/30 E X |
| 3,790,430 | 2/1974 | Mochel | 65/30 E X |

*Primary Examiner*—Robert L. Lindsay, Jr.
*Attorney, Agent, or Firm*—Smith, Harding, Earley & Follmer

[57] ABSTRACT

A method of forming an ampul comprises drawing an aluminosilicate glass tube containing alkali metal ions and having the inner and outer diameter desired for the body of the ampul to reduce the diameter and provide a portion having an inner diameter in the range of from about 0.007 to about 0.03 cm. Advantageously the transition shoulder portion extending from the full diameter to the reduced diameter is heated while rotating and then subjected to axial compression to partially collapse it. The reduced diameter portion of the tube is then severed to form an ampul with a body having the inner and outer diameters of the original tube and a discharge passage which has a discharge opening with a diameter in the range of from about 0.007 to about 0.03 cm. and which has a length at least ten times the diameter of the discharge opening. The drawing provides for a small taper in the discharge passage which preferably will have a diameter equal to from about 2 to about 1 times the diameter of the discharge opening. Alternatively, the drawing operation additionally provides a portion tapering gradually to an inner diameter smaller than the desired diameter of the discharge opening and, after the severing operation, the last-mentioned portion is removed by grinding to provide a discharge opening of the desired size.

6 Claims, 15 Drawing Figures

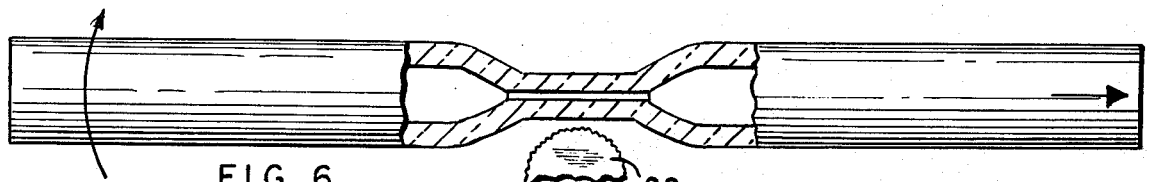
FIG. 6.
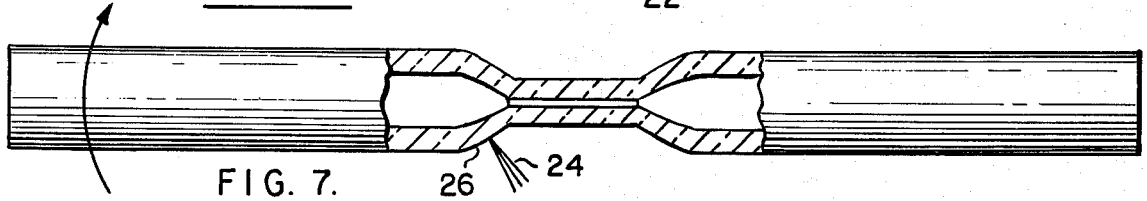
FIG. 7.
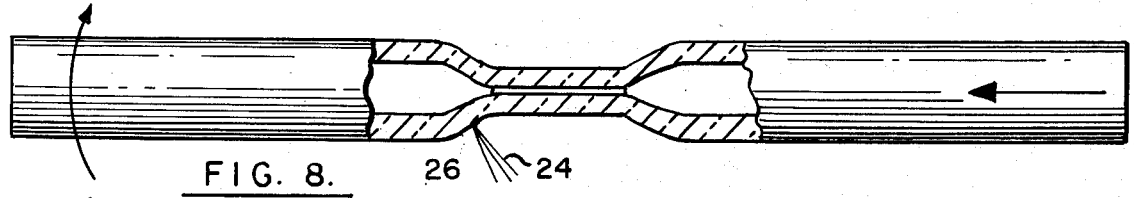
FIG. 8.
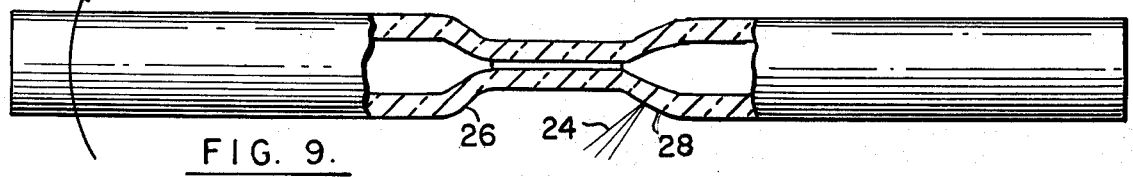
FIG. 9.
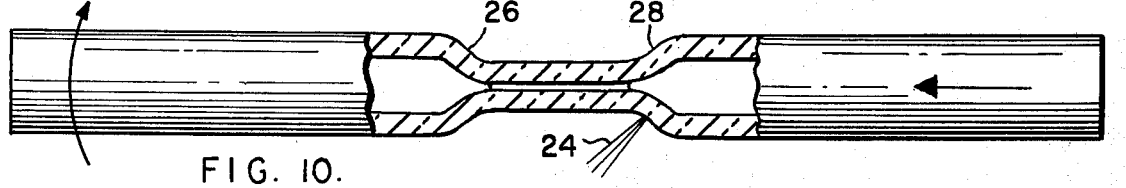
FIG. 10.
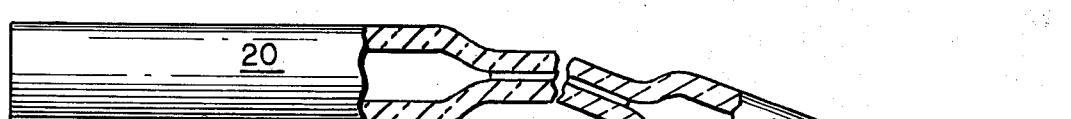
FIG. 11.
FIG. 12.
FIG. 13.
FIG. 14.
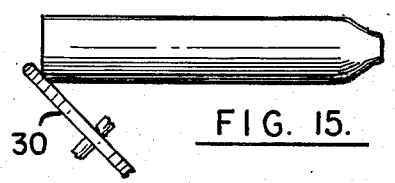
FIG. 15.

METHOD OF MAKING GLASS AMPUL FOR JET INJECTOR

BACKGROUND OF THE INVENTION

Ampuls of the type employed with jet injectors which have a body for the reception of a plunger and a restricted discharge opening are known to require a smooth walled discharge passage of very small diameter, for example from about 0.007 to about 0.03 cm. and a length of at least 10 times the diameter of the passage to provide for proper flow of the medicament on injection. Heretofore an all glass ampul having these requirements has been unavailable despite the fact that glass ampuls are the most desirable from the point of view of compatibility with the contained liquid medicament and because the contained medicament is clearly visible. The problems of making a glass ampul for a jet injector have centered on the difficulty of providing a proper discharge passage and providing adequate strength to cope with handling and with the high pressures employed in jet injectors. In addition desirable flow characteristics must be observed and the ampul shaped to discharge the maximum amount of liquid from the ampul.

BRIEF DESCRIPTION OF THE DRAWINGS

FIG. 6 is a schematic view of a tube stretching step in making the ampul of FIG. 1;

FIG. 7 is a schematic view of a shoulder heating step in making the ampul of FIG. 1;

FIG. 8 is a schematic view of a shoulder buckling step in making the ampul of FIG. 1;

FIG. 9 is a schematic view of a shoulder heating step in making the ampul of FIG. 1;

FIG. 10 is a schematic view of a shoulder buckling step in making the ampul of FIG. 1;

FIG. 11 is a schematic view of the tube severing step in making the ampul of FIG. 1;

FIG. 12 is a schematic view of a tube cut-off step in making the ampul of FIG. 1;

FIG. 13 is a schematic view of a tube grinding step in making the ampul of FIG. 1;

FIG. 14 is a schematic view of a tube cut-off step in making the ampul of FIG. 1; and FIG. 15 is a schematic view of a tube beveling step in making the ampul of FIG. 1.

DETAILED DESCRIPTION

Figure 1:
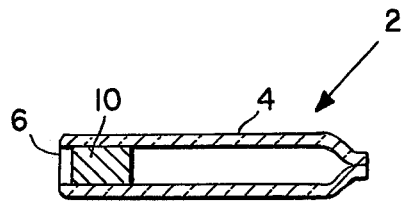
FIG. 1 is a vertical section of a jet injector ampul in accordance with the invention.
Figure 3:
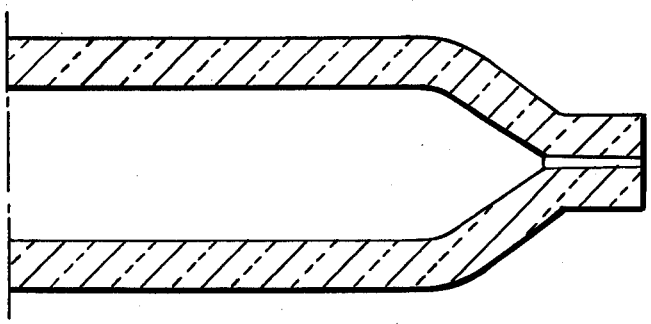
FIG. 3 is an enlarged view of the discharge end of the ampul of FIG. 1 at one stage of its production.
Figure 2:
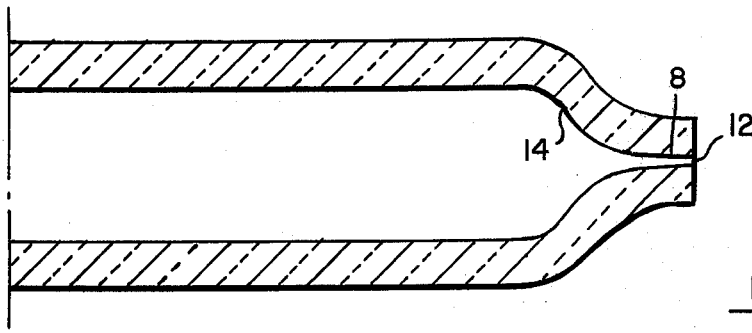
FIG. 2 is an enlarged view of the discharge end of the ampul of FIG. 1.

The ampul of the invention is made of an aluminosilicate glass, preferably an aluminoborosilicate glass, containing alkali metal ion preferably lithium, sodium or potassium or combinations thereof. Referring to FIG. 1, a typical ampul 2 of the invention has a body 4 with an open end 6 and a restricted discharge passage 8 (FIG. 2). Ampul 2 is adapted to contain a plunger 10 of, for example, rubber which is adapted to be actuated by a jet injector (not shown) to expel a liquid medicament (not shown) contained in ampul 2 through discharge passage 8 and out through discharge opening 12. Ampul 2 has a smooth reverse curve interior shoulder portion 14 forming a smooth transition from the basic inner diameter of body 4 to the restricted discharge passage 8 for good flow and for maximum discharge of liquid by plunger 10.

The terminal discharge opening has a diameter in the range of from about 0.007 to about 0.03 cm. Discharge passage 8 has a diameter of from about 2 to about 1 times the diameter of the discharge opening and advantageously a length of at least ten times the diameter of the discharge opening. Any increase of the length of the discharge passage over the specified minimum is no advantage and will generally be held to a minimum in order to keep the cost of the ampul as low as possible. The diameter of passage 8 is exaggerated in FIG. 2 in order that it may be seen clearly.

The ampul 2 is strengthened by virtue of causing ions of a monovalent metal of larger size than the alkali metal ions in the glass to be exchanged for alkali metal ions originally in the glass adjacent the surfaces of the ampul to create a compressive stress in the surface layers of the ampul.

Advantageously the aluminosilicate glass will contain about 5 to 25% alkali metal oxide, 5 to 25% $Al_2O_3$, and $SiO_2$, with the total of alkali metal oxide, $Al_2O_3$ and $SiO_2$ being at least 80% by weight of the glass composition. This refers to the non-ion exchange portion of the glass ampul. Sodium and lithium are preferred of the akali metal ions to be contained in the glass.

For the monovalent metal ion exchanged for a smaller alkali metal ion, any of the alkali metal ions other than lithium may be employed so long as it is larger than the ion in the glass for which it is exchanged. Preferably sodium ions are exchanged for lithium ions or potassium ions are exchanged for sodium ions. Other monovalent metal ions may be employed such as copper and silver, for example, copper being exchanged for lithium or silver being exchanged for sodium.

Preferably the larger monovalent metal ions replace the smaller alkali metal ions to a depth of at least 5 microns, advantageously at least 15 microns. Any greater depth that is desired may be employed.

All of the aluminosilicate ion exchanged glasses disclosed in U.S. Pat. No. 3,790,430, issued Feb. 5, 1974, may be employed in the ampul of this invention, and this entire patent is incorporated herein by reference. Three preferred glass compositons are as set forth below:

| CONSTITUENT | PERCENT BY WEIGHT | | |
|---|---|---|---|
| | A | B | C |
| $SiO_2$ | 64.8 | 73.9 | 74.8 |
| $Al_2O_3$ | 21 | 6.1 | 5.6 |
| $B_2O_3$ | — | 9.8 | 9.6 |
| $Na_2O$ | 9 | 6.0 | 6.4 |
| $K_2O$ | 0.2 | 0.7 | 0.5 |
| $Li_2O$ | 3.8 | .02 | — |
| MgO | 0.8 | .05 | — |
| CaO | — | 0.9 | 0.9 |
| BaO | — | 2.2 | 2.2 |
| $Fe_2O_3$ | 0.05 | .03 | — |
| Chlorine | 0.3 | 0.2 | — |
| Fluorine | 0.05 | 0.1 | — |
| Total | 100.0 | 100.0 | 100.0 |

Sodium ions in and adjacent the glass surface areas of each of the above preferred glass compositions may be replaced with a larger monovalent metal ion advantageously potassium. In the case of composition A, sodium ions may be exchanged for lithium for example.

Method

The method of the invention for making the above described ampul comprises drawing an aluminosilicate glass tube containing alkali metal ions having the inner and outer diameter desired for the body of the ampul to provide a major reduction in the outer diameter of a portion of the tube of from about 45 to about 70%, preferably from about 55 to about 65%, and this provides a reduced diameter portion having an inner diameter in the range of from about 0.007 to about 0.03 cm. This is accomplished by heating the tube while rotating it and then drawing the tube. Preferably the transition shoulder portion of the tube is heated and compressed axially while rotating the tube to shorten the conical section to provide for better flow and make it easier to grind back the discharge end to a desirable diameter of the discharge opening. The reduced diameter portion is then severed to form two ampuls 2 each with a body having the inner and outer diameters of the original tube and a discharge passage having a discharge opening having a diameter in the range of from about 0.007 to about 0.03 cm. and advantageously a length at least 10 times the diameter of the discharge opening. The discharge passage will have a gradual downward taper towards the discharge opening and advantageously a diameter of from about 2 to about 1 times the diameter of the discharge opening.

Subsequently, monovalent metal ions are diffused from an ion containing medium in vapor, liquid or solid form into the ampul adjacent its surfaces and alkali metal ions are diffused from the ampul into the medium with the metal ions diffusing into the ampul being larger than the alkali metal ions of the glass to create a compressive stress in the surface layers of the ampul to increase the strength of the ampul so as to withstand handling and the high pressures associated with jet injectors. The larger metal ions and the smaller alkali metal ions have been detailed above as has the composition of the glass. The ion exchange strengthening process is set forth in detail in U.S. Pat. No. 3,790,430 referred to above and incorporated herein by reference.

Alternatively the above-described method can be modified by continuing the first drawing operation so as to provide a portion having an inner diameter smaller than the desired diameter for the discharge opening. On severing the last-mentioned portion it is ground back until the desired diameter of discharge opening is reached. This procedure is possible since the inner diameter of the entire reduced portion is tapered.

The process is illustrated schematically in FIGS. 4 through 15.

Figure 4:
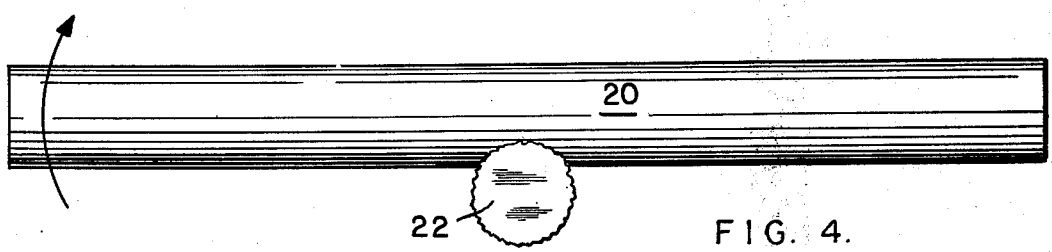
FIG. 4 is a schematic view of a tube heating step in making the ampul of FIG. 1.
Figure 5:
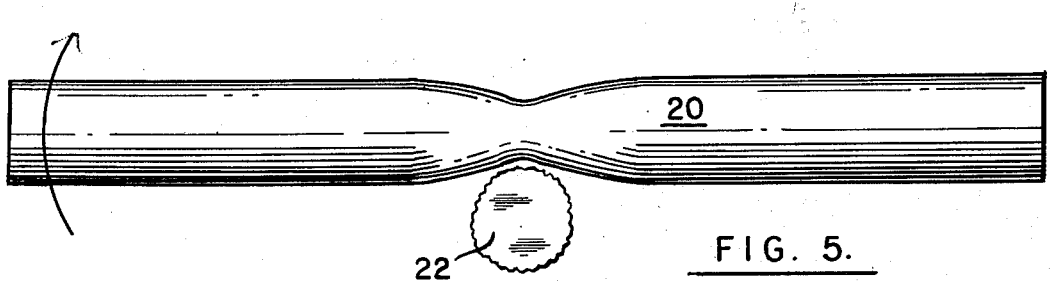
FIG. 5 is a schematic view of a tube shrinking step in making the ampul of FIG. 1.

As seen in FIG. 4, a glass tube 20 is rotated (by a glass lathe not shown) while heating the bottom third with a relatively large flame 22. The heated tube (FIG. 5) shrinks away from the flame and then the tube is stretched axially (FIG. 6). A needle flame 24 (FIG. 7) is directed to the left shoulder 26 while rotating tube 20 and then the tube is compressed axially to partially collapse shoulder 26 to the position shown in FIG. 8. As illustrated in FIGS. 9 and 10 this operation is repeated on shoulder 28. The thus formed tube is then annealed. The mid-section is now scribed and the tube is snapped in half as shown in FIG. 11. The discharge end of each separated section is cut off (FIG. 12) by a grinding wheel 30 and then ground back (FIG. 13) to get the desired discharge opening size. The butt end of each separated section is cut off (FIG. 14) and beveled (FIG. 15) to provide a finished ampul of the desired length.

The following example is illustrative of the method of the invention:

EXAMPLE

For the preparation of a strengthened glass cartridge commercially manufactured glass tubing was used having the following composition:

| CONSTITUENT | Percent by Weight |
|---|---|
| $SiO_2$ | 73.9 |
| $Al_2O_3$ | 6.1 |
| $B_2O_3$ | 9.8 |
| $Na_2O$ | 6.0 |
| $K_2O$ | 0.7 |
| $Li_2O$ | .02 |
| MgO | .05 |
| CaO | 0.9 |
| BaO | 2.2 |
| $Fe_2O_3$ | .03 |
| Chlorine | 0.2 |
| Fluorine | 0.1 |
| Total | 100.0 |

Cartridges were fabricated on a glass-working lathe, using an oxygen natural gas torch, using the following steps:

1. The tubing having a 0.4 inch O.D., 0.25 I.D. was cut to a length of 5 inches;
2. The tubing was rotated while applying heat at the bottom one-third of the tubing surface, midway along the 5-inch length;
3. The tube was pulled ½ inch axially to neck down the central heated tubing section reducing the O.D. to 0.2 inch;
4. A needle flame was applied to one tapered shoulder, while rotating, and then the shoulder was compressed ½ inch axially to shorten the conical section. This was repeated with the other shoulder;
5. The tubing was then annealed by placing it in an electrically powered furnace with an air atmosphere at room temperature, heating the furnace to 1055°±5° F. in 30 minutes, holding at 1055°±5° F. for 15 minutes, and then turning off the furnace power and letting the tubing cool in the furnace to room temperature.
6. The reduced portion was cut in the middle. Two cartridges were thus obtained per each 5-inch tubing length;
7. The orifice tip ends of the cartridge were then cut back with a 180 grit silicon carbide wheel and ground down with appropriate intermediate gaging, to obtain a discharge opening of 0.013 cm. while eliminating sharp edges. The butt end of each tube was cut off to provide tubes 2 inches in length. The edges of the butt ends were chamfered slightly with a grinding wheel.

For ion exchange strengthening treatment, the cartridges were placed vertically, with the orifice tip down, in stainless steel skeletal racks. These racked cartridges were immersed for 2 hours in molten potassium nitrate ($KNO_3$) salt contained in stainless steel pots and heated by externally surrounding electric heating elements to 932° F. At the end of the treatment period, the hot cartridges were inverted to pour out excess $KNO_3$, then cleaned by alternately being immersed in boiling distilled water and blowing compressed air to clean the orifice tip.

Chemical durability of the strengthened cartridges was such that no visual changes or significant strength decreases were effected by exposure in 5 percent hydrochloric acid or in several liquid media simulating anticipated usage contents. These were:

1. Potassium Biphthalate (pH = 3.2);
2. Isotonic Sodium Chloride (pH = 4.0);
3. Isotonic Lidocaine Hydrochloride (pH = 6.0);
4. Isotonic Phosphate (pH = 8.0)

We claim:

1. The method of forming a glass jet injector ampul having a body open at one end and having a restricted discharge passage at the other end with a discharge opening of a diameter of from about 0.007 to about 0.03 cm. comprising:

drawing an aluminosilicate glass tube containing alkali metal ions and having the inner and outer diameter desired for the body of the ampul to provide a major reduction in the diameter of a portion of the tube to provide a portion having an inner diameter in the range of from about 0.007 to about 0.03 cm., heating the transition portions extending between the full diameter of the tube and the reduced diameter portion while rotating the tube and compressing the tube axially to partially collapse said portions, severing the reduced diameter portion of the tube to form an ampul with a body having the inner and outer diameters of the original tube and a discharge passage having a discharge opening having a diameter in the range of from about 0.007 to about 0.03 cm.

2. The method of claim 1 in which after the drawing the reduced diameter portion has an outer diameter reduced by from about 45 to about 70% of its original outer diameter.

3. The method of claim 1 in which the aluminosilicate glass is an aluminoborosilicate glass.

4. The method of forming a glass jet injector ampul having a body open at one end and having a restricted discharge passage at the other end with a discharge opening of a diameter of from about 0.007 to about 0.03 cm comprising:

drawing an aluminisilicate glass tube containing alkali metal ions and having the inner and outer diameter desired for the body of the ampul to provide a major reduction in the diameter of a portion of the tube to provide a portion having an inner diameter smaller then a predetermined inner diameter in the range of from about 0.007 to about 0.03 cm., severing the reduced diameter portion of the tube to form an ampul with a body having the inner and outer diameters of the original tube, grinding back the severed end of the tube until the predetermined inner diameter of the discharge opening is provided.

5. The method of claim 4 in which before severing the transition portions extending between the full diameter of the tube and the reduced diameter portion are heated while being rotated and the tube is compressed axially to partially collapse said portions.

6. The method of claim 5 in which the aluminosilicate glass is an aluminoborosilicate glass.

* * * * *